United States Patent
Song

(10) Patent No.: US 8,412,188 B2
(45) Date of Patent: Apr. 2, 2013

(54) MANAGING SESSION INFORMATION IN A WIRELESS COMMUNICATIONS SYSTEM

(75) Inventor: Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 12/695,004

(22) Filed: Jan. 27, 2010

(65) Prior Publication Data

US 2011/0183666 A1      Jul. 28, 2011

(51) Int. Cl.
*H04W 4/00* (2009.01)

(52) U.S. Cl. ............... 455/432.1; 455/435.1; 455/435.2; 455/436; 455/440; 455/443

(58) Field of Classification Search ............... 455/432.1, 455/435.1, 435.2, 436, 440, 443
See application file for complete search history.

(56) References Cited

U.S. PATENT DOCUMENTS

| | | | |
|---|---|---|---|
| 2005/0184145 A1* | 8/2005 | Law et al. | 235/380 |
| 2007/0032234 A1* | 2/2007 | Jain et al. | 455/435.1 |
| 2007/0143483 A1* | 6/2007 | Lim et al. | 709/227 |
| 2007/0153728 A1* | 7/2007 | Le et al. | 370/329 |
| 2007/0153750 A1 | 7/2007 | Baglin et al. | |
| 2008/0267115 A1* | 10/2008 | Lv et al. | 370/328 |
| 2009/0207805 A1* | 8/2009 | Zou | 370/331 |

OTHER PUBLICATIONS

International Search Report and Written Opinion—PCT/US2011/022456, ISA/EPO—Apr. 28, 2011.

* cited by examiner

*Primary Examiner* — Jinsong Hu
*Assistant Examiner* — Qun Shen
(74) *Attorney, Agent, or Firm* — Raphael Freiwirth

(57) ABSTRACT

In an embodiment, a network communication entity (NCE) determines that an access terminal has re-entered a serving area of an access network, and also determines whether a given period of time, associated with a previous session of the access terminal in the serving area, has expired. If the NCE determines no expiration, the NCE re-activates session information associated with the previous session, including re-activation of an identifier that uniquely identifies the access terminal within the serving area. If the access terminal had a session in another serving area before re-entering the serving area, the NCE stores the session information for the access terminal in the other serving area in association with a period of time indicative of a duration during which the session information continues to be valid within the other serving area. The NCE may either correspond to the access terminal or a portion of the access network.

23 Claims, 12 Drawing Sheets

MANAGING SESSION INFORMATION IN A WIRELESS COMMUNICATIONS SYSTEM

BACKGROUND OF THE INVENTION

1. Field of the Invention

Embodiments of the invention are directed to managing session information in a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3$^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, a network communication entity (NCE) determines that an access terminal has re-entered a serving area of an access network, and also determines whether a given period of time, associated with a previous session of the access terminal in the serving area, has expired. If the NCE determines no expiration, the NCE re-activates session information associated with the previous session, including re-activation of an identifier that uniquely identifies the access terminal within the serving area. If the access terminal had a session in another serving area before re-entering the serving area, the NCE stores the session information for the access terminal in the other serving area in association with a period of time indicative of a duration during which the session information continues to be valid within the other serving area. The NCE may either correspond to the access terminal or a portion of the access network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
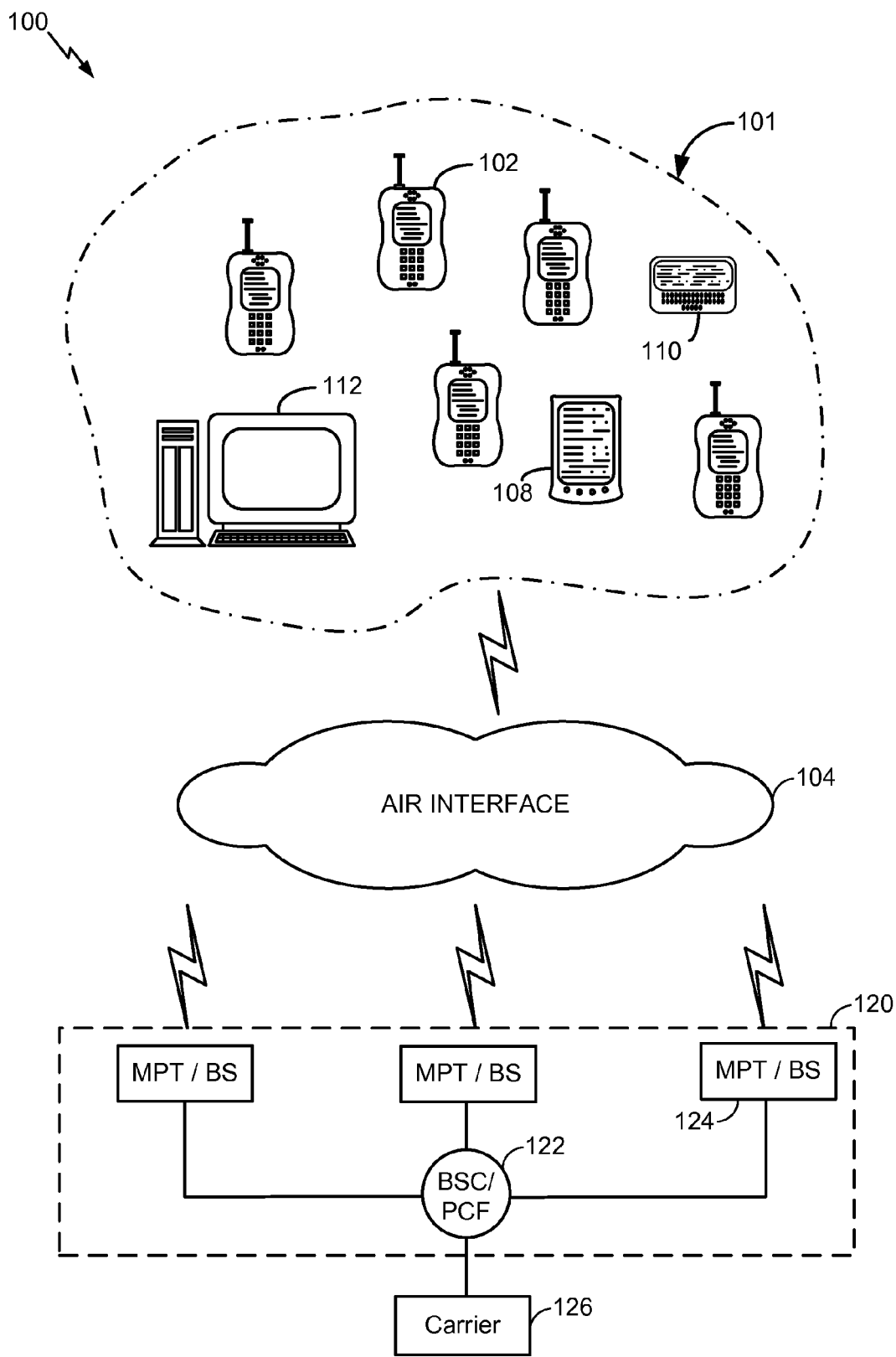
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
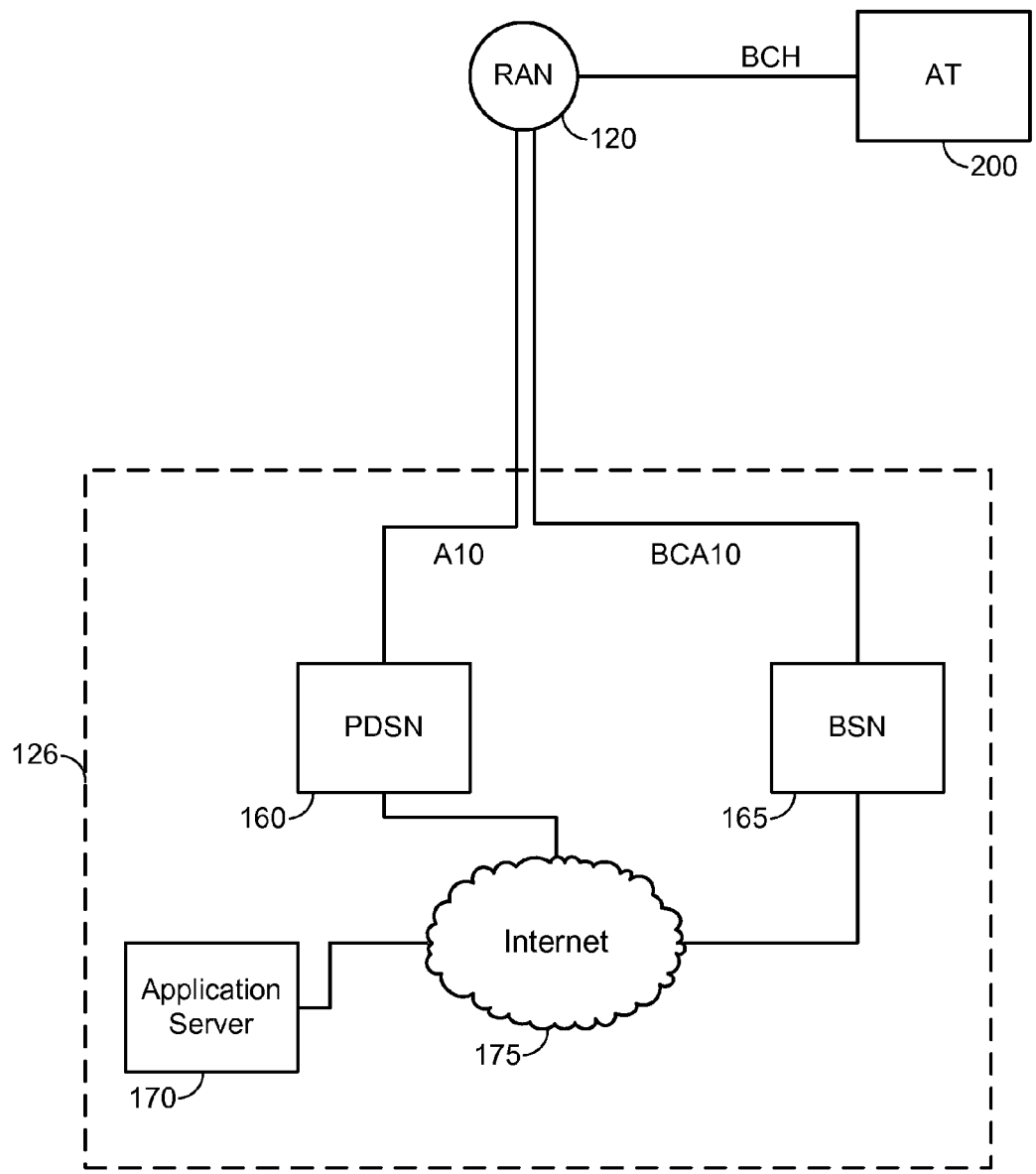
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
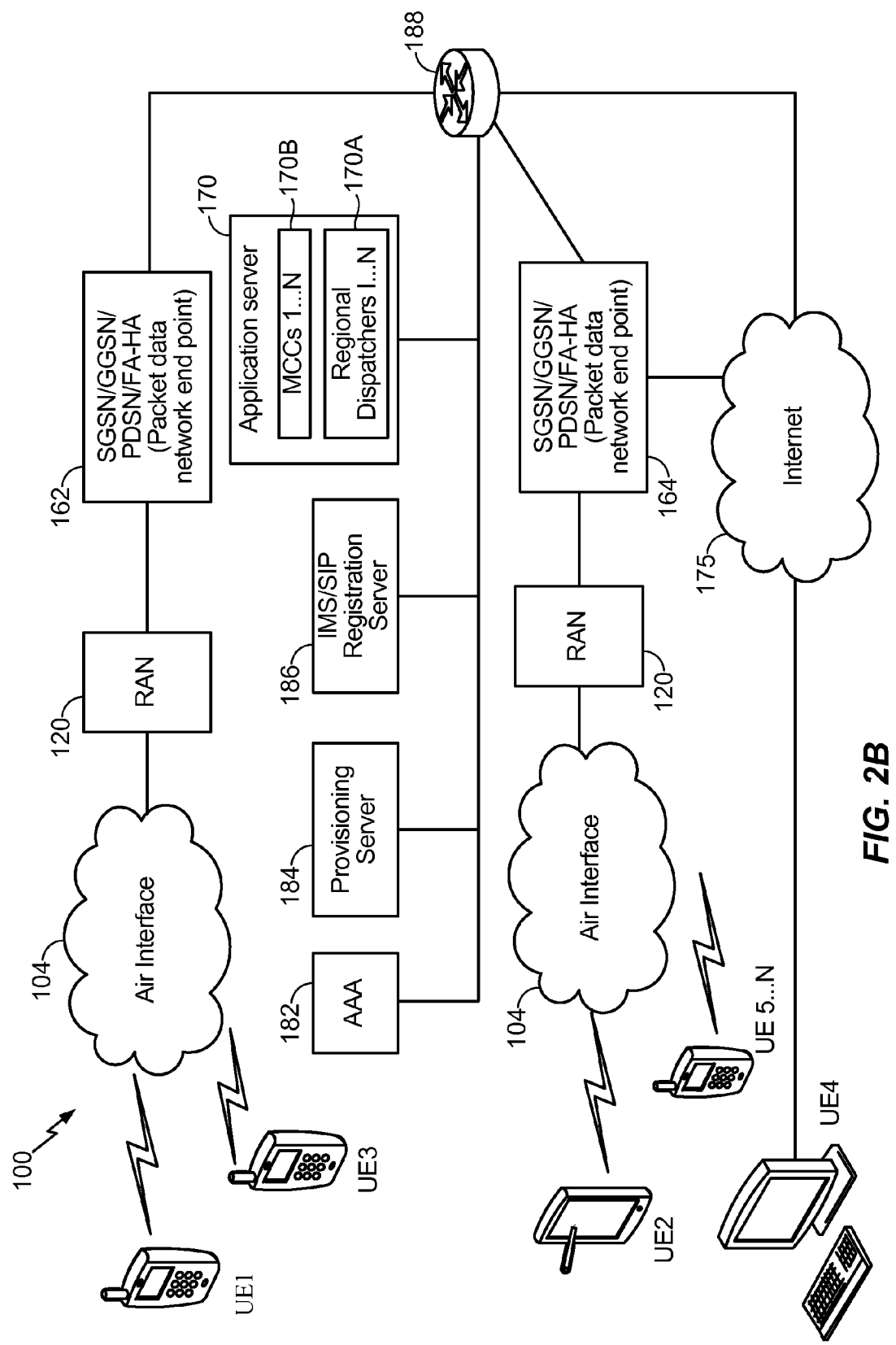
FIG. 2B illustrates an example of the wireless communication of FIG. 1 in more detail in accordance with at least one embodiment of the invention.

FIG. 2B illustrates an example of the wireless communication 100 of FIG. 1 in more detail. In particular, referring to FIG. 2B, ATs 1 ... N are shown as connecting to the RAN 120 at locations serviced by different packet data network endpoints. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 ... N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 ... N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between ATs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the ATs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
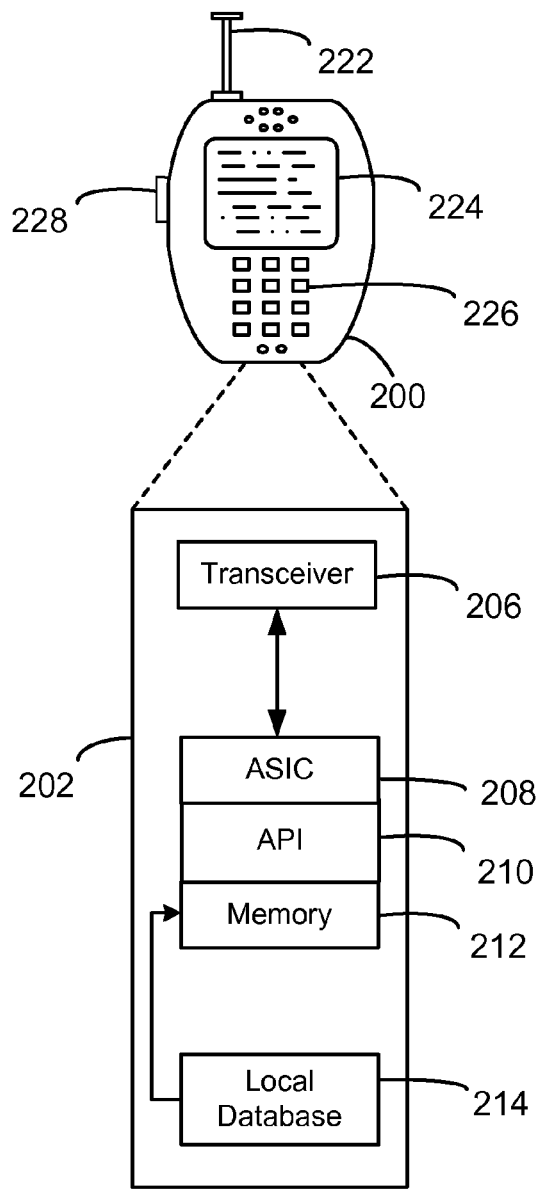
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Further, as will be appreciated by one of ordinary skill in the art, a given access terminal is typically required to identify itself to an access network before the access network will provision resources (e.g., a traffic channel (TCH), QoS, etc.) to the given access terminal. For example, in EV-DO 1x, the given access terminal may identify itself to the access terminal with a Unicast Access Terminal Identifier (UATI). Accordingly, the given access terminal will attach its UATI to reverse link messaging so that the access network is aware of the sender's identity. Likewise, UATIs can be used in downlink messaging to identify an intended recipient or access terminal.

UATIs function to uniquely identify an AT only within a particular serving area (e.g., a particular subnet, sector, cell, etc.). Thus, if the AT moves outside of the serving area (e.g., the AT hands off to another cell, another subnet, etc.), a new UATI is assigned to the AT. If the AT attempts to request resources (e.g., QoS resources, a TCH, etc.) from the access network in a serving area without a proper UATI (e.g., by using the UATI from the old serving area, etc.), the access network will not grant the requested resources to the requesting AT (e.g., at least, until the request can be associated with a proper UATI).

Accordingly, as will be described below with respect to FIGS. 4A through 4D, a given AT conventionally sets up a session in a given serving area by acquiring session information (e.g., a UATI and/or obtain other session parameters specific to the given serving area, such as a list of negotiated protocols and/or QoS profiles) that can be used by the given AT to send and/or receive data in the given serving area (e.g., in the event that the given AT desires to send reverse-link data, or in the event that the RAN 120 has data to send to the AT on the downlink).

Figure 4A:
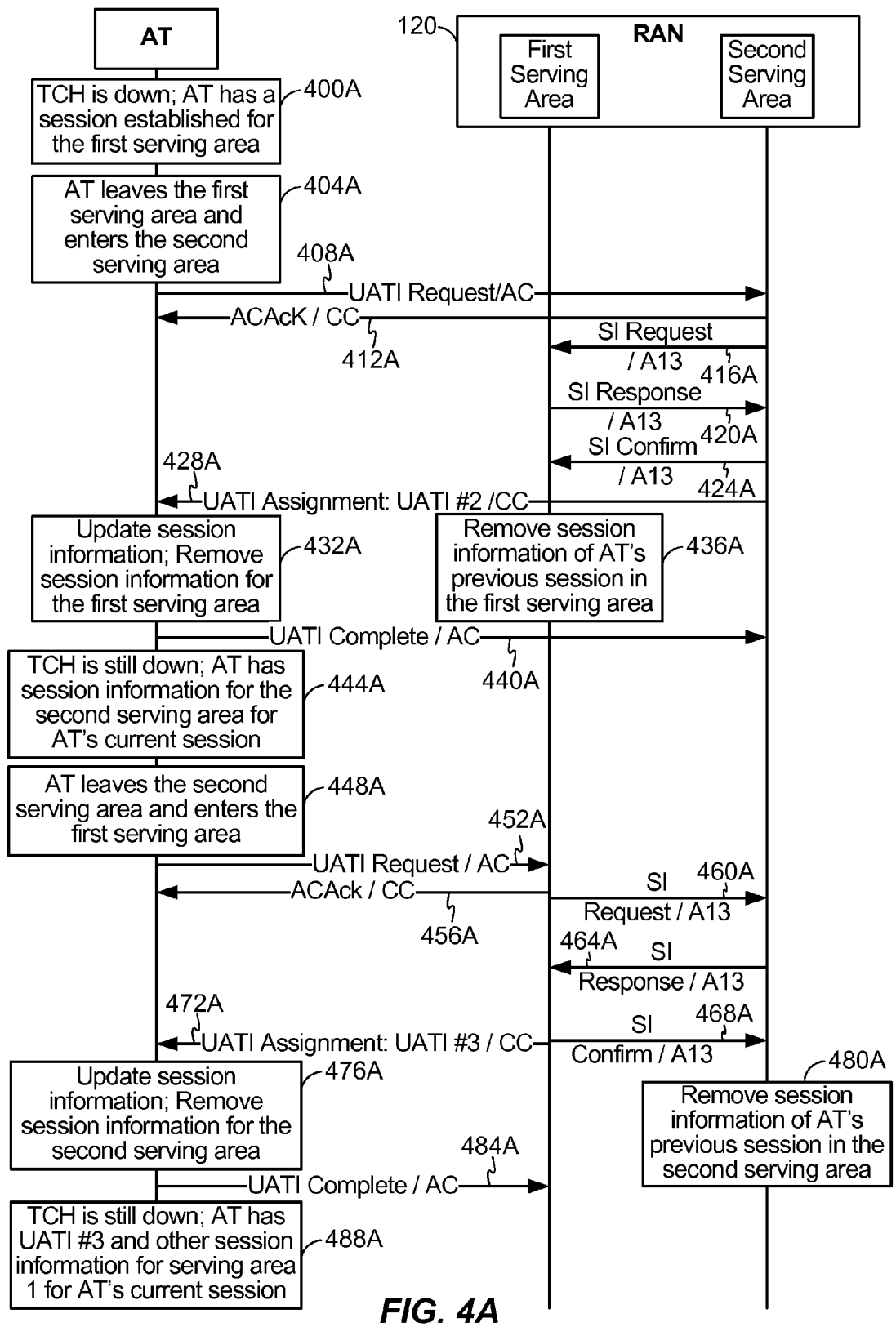
FIG. 4A illustrates a conventional process of updating session information for an access terminal while the access terminal navigates in different serving areas of a wireless communications system.
Figure 4B:
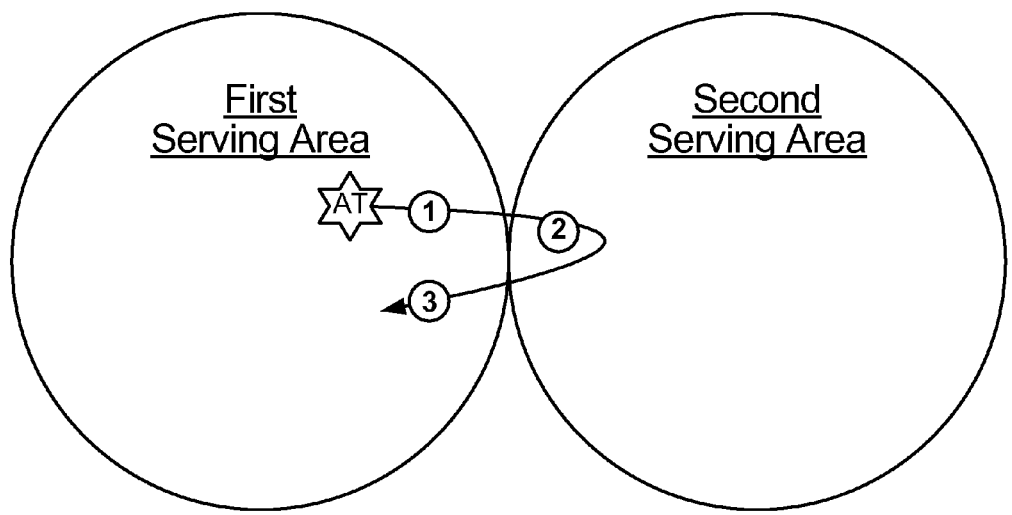
FIG. 4B illustrates an access terminal navigating through different serving areas of a wireless communications system.

Referring to FIG. 4A, assume that a given AT is located in a first serving area (e.g., a subnet), that the given AT does not have a TCH, is not currently participating in a communication session and that the given AT has a session established in the first serving area, 400A. As mentioned above, having a session (e.g., a PPP session) established means the given AT has obtained session information (e.g., UATI #1, list of negotiated protocols, QoS profiles, etc.) that can be used to send/receive data between the given AT and the RAN 120 in the first serving area. Referring to FIG. 4B, at 400A of FIG. 4A, the given AT may be located at position #1 within the first serving area.

Turning back to FIG. 4A, assume that the given AT leaves the first serving area and enters a second serving area, 404A. For example, referring to FIG. 4B, the given AT may travel from position #1 within the first serving area to position #2 within the second serving area.

In order to facilitate the given AT's handoff from the first serving area to the second serving area, the given AT has to establish its session with the second serving area (e.g., so that the given AT can be contacted in the second serving area, so that the given AT can send data and be recognized in the second serving area, so that the RAN 120 is aware that the given AT is no longer in the first serving area, etc). Accordingly, the given AT sends a UATI request on a reverse link access channel to the RAN 120 to request a UATI that can be used in the second serving area, 408A.

After the RAN 120 receives the UATI request, the RAN 120 acknowledges receipt of the UATI request from the given AT by sending an ACAck message to the given AT on the downlink control channel (CC), 412A. However, while the RAN 120 acknowledges the UATI request in 412A, the RAN 120 has not yet assigned the UATI for the second serving area to the given AT.

After the RAN 120 receives the UATI request, aside from ACKing the UATI request as in 412A, the second serving area (e.g., a RNC controlling a particular subnet), which in this case is the 'target' serving area for the handoff, sends an A13 session information request to the first serving area (e.g., again, this can correspond to a RNC controlling a given subnet), which in this case is the 'source' serving area for the handoff, 416A. The A13 session information request requests session information associated with the given AT's previous session in the first serving area. The first serving area responds to the A13 session information request with an A13 session information response providing the requested session information, 420A. The second serving area ACKs the A13 session information response by sending an A13 session information confirm message back to the first serving area, 424A.

After the first and second serving areas coordinate the given AT's handoff from the first serving area to the second serving area in 416A through 424A, the second serving area assigns a UATI (i.e., UATI #2) for the given AT to use in the second serving area by sending a UATI assignment on the downlink CC, 428A. After receiving the UATI assignment, the given AT updates one or more registers storing its UATI from the first serving area (i.e., UATI #1) with the newly assigned UATI of the second serving area (i.e., UATI #2), 432A. Similarly, upon receiving the session information confirm message in 424A, the first serving area also removes the session information that was associated with the given AT's previous session, 436A. The given AT transmits a UATI complete message to the RAN 120 on the reverse link access channel, 440A.

Accordingly, in 444A, the given AT is now located in the second serving area (e.g., at position #2 as shown in FIG. 4B), the given AT does not have a TCH, is not currently participating in a communication session, and the given AT has a session established in the second serving area. At some later point in time, assume that the given AT leaves the second serving area and re-enters the second serving area, 448A. For example, referring to FIG. 4B, the given AT may travel from position #2 within the second serving area to position #3 within the first serving area.

In order to facilitate the given AT's handoff from the second serving area to the first serving area, the given AT has to re-establish its session with the first serving area (e.g., so that the given AT can again be contacted in the first serving area, so that the given AT can again send data and be recognized in the first serving area, so that the RAN 120 is aware that the given AT is no longer in the second serving area, etc). Accordingly, blocks 452A through 488A generally correspond to blocks 408A through 444A as discussed above, except blocks 452A through 488A show how the given AT hands off back to the first serving area and obtains UATI #3, whereas blocks 408A through 444A show how the given AT handed off to the second serving area and obtained UATI #2. Accordingly, a further description of blocks 452A through 488A has been omitted for the sake of brevity. As will be appreciated, upon entry into any new (or previously visited) serving area that has its own unique session information for each of its ATs, the given AT is required to set-up a session (e.g., obtain a UATI for the serving area and/or establish other session parameters) before a TCH can be established in the new (or previously visited) serving area.

While FIG. 4A is described whereby the given AT remains idle (e.g., does not participate in an actual communication session), at any point during the process of FIG. 4A, the RAN 120 may have data to send to the given AT, or the given AT may have data to send to the RAN 120 (e.g., if a user of the given AT requests call initiation, etc.). Accordingly, FIGS. 4C and 4D each illustrate examples of how the given AT can send reverse-link data to the RAN 120 after moving from the second serving area back to the first serving area in 448A.

Figure 4C:
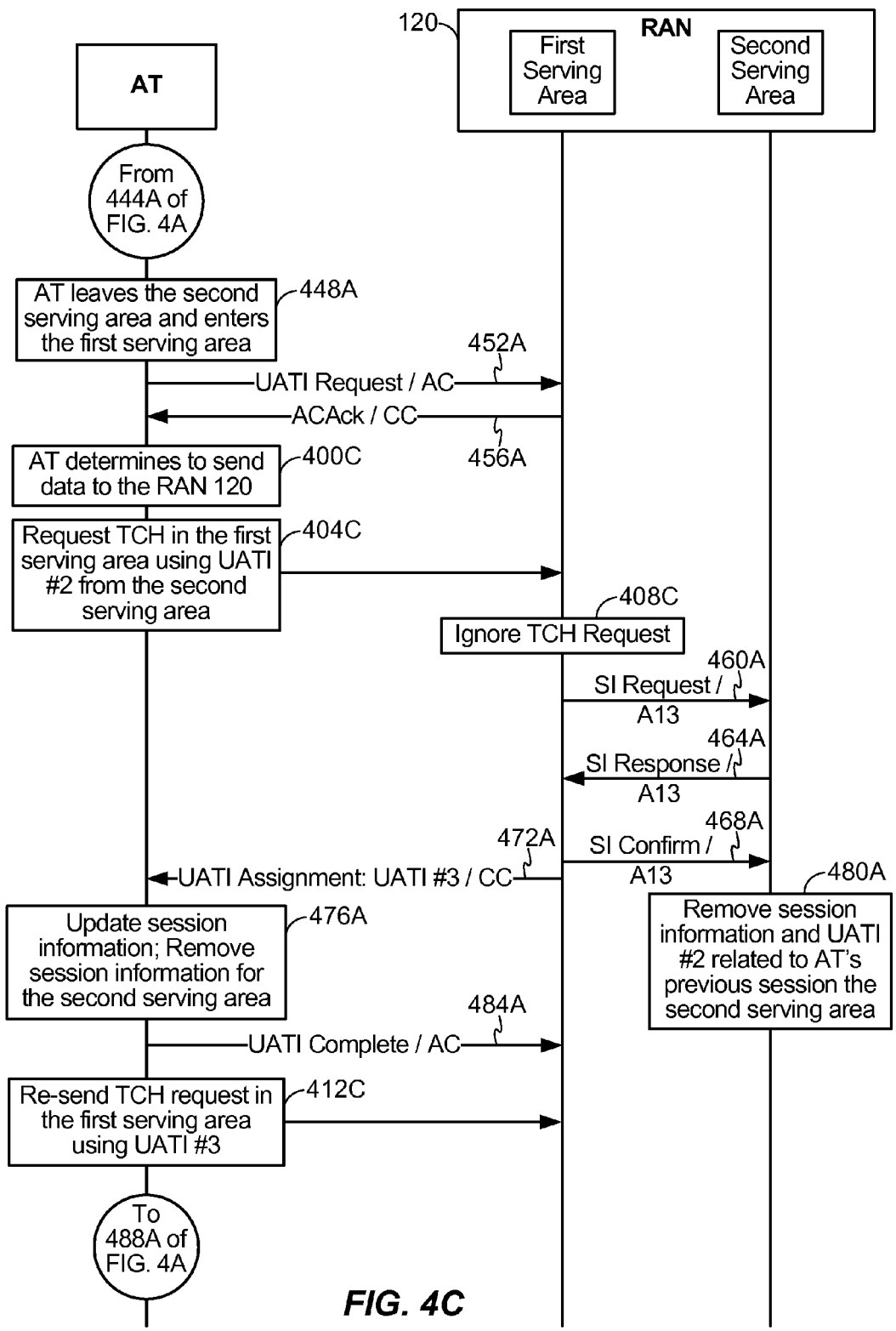
FIG. 4C illustrates a more detailed illustration of a portion of the process of FIG. 4A.

Referring to FIG. 4C, the given AT leaves the first serving area and enters the second serving area, 448A. For example, referring to FIG. 4B, the given AT may travel from position #2 within the second serving area to position #3 within the first serving area. The given AT sends a UATI request on a reverse link access channel to the RAN 120 to request a UATI that can be used in the first serving area, 452A, and the RAN 120 acknowledges receipt of the UATI request from the given AT by sending an ACAck message to the given AT on the downlink control channel (CC), 456A.

At this point, unlike FIG. 4A where the given AT remains idle, assume that the given AT determines to send data to the RAN 120 in 400C. For example, a user of the given AT can press a push-to-talk (PTT) button to request initiation of a PTT session, the user can request to send a text message, to check voicemails, etc. In 404C, the given AT sends a TCH request in the first serving area using its current UATI, which is actually UATI #2 associated with the second serving area. Thus, the given AT is using the wrong UATI at this point because the given AT has not yet been assigned a UATI to use for its current serving area. As such, the first serving area ignores the TCH request in 408C.

After the RAN 120 receives the UATI request, aside from ACKing the UATI request as in 456A, the first serving area sends an A13 session information request to the second serving area, 460A, receives an A13 session information response providing the request session information, 464A and sends an A13 session information confirm message to the second serving area, 468A.

After the first and second serving areas coordinate the given AT's handoff from the second serving area back to the first serving area in 460A through 468A, the first serving area assigns a UATI (i.e., UATI #3) for the given AT to use in the first serving area by sending a UATI assignment on the downlink CC, 472A. After receiving the UATI assignment, the given AT updates one or more registers storing its UATI from the second serving area (i.e., UATI #2) with the newly assigned UATI of the first serving area (i.e., UATI #1), 476A. Similarly, upon receiving the session information confirm message in 468A, the second serving area also removes the session information that was associated with the given AT's previous session, 480A. The given AT transmits a UATI complete message to the RAN 120 on the reverse link access channel, 484A. At this point, now that the given AT has a valid UATI for use in the first serving area, the given AT can re-send its TCH request in the first serving area with the valid UATI (i.e., UATI #3), 412C.

Figure 4D:
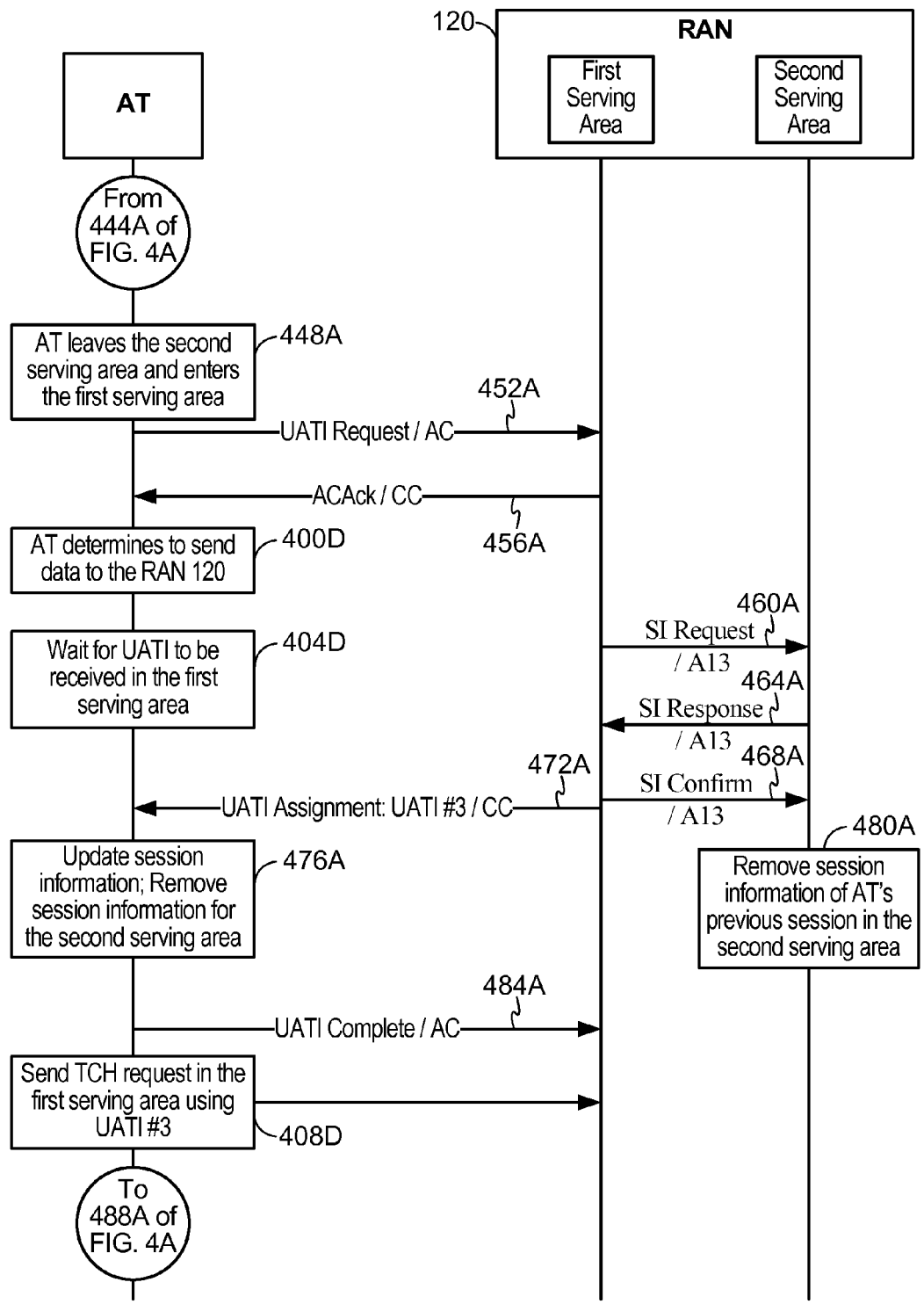
FIG. 4D illustrates an alternative illustration of a portion of the process of FIG. 4A.

Referring to FIG. 4D, the given AT leaves the first serving area and enters the second serving area, 448A. For example, referring to FIG. 4B, the given AT may travel from position #2 within the second serving area to position #3 within the first serving area. The given AT sends a UATI request on a reverse link access channel to the RAN 120 to request a UATI that can be used in the first serving area, 452A, and the RAN 120 acknowledges receipt of the UATI request from the given AT by sending an ACAck message to the given AT on the downlink control channel (CC), 456A.

At this point, unlike FIG. 4A where the given AT remains idle, assume that the given AT determines to send data to the RAN 120 in 400D. For example, a user of the given AT can press a push-to-talk (PTT) button to request initiation of a PTT session, the user can request to send a text message, to check voicemails, etc. In 404D, instead of sending a preemptive TCH request with the wrong UATI (i.e., the old UATI from the second serving area), the given AT waits to receive a UATI for the first serving area before sending any TCH requests, 404D.

Next, 460A through 484A are executed as described above with respect to FIG. 4A and/or FIG. 4C, and a further description thereof has been omitted for the sake of brevity. After obtaining a valid UATI for use in the first serving area, the given AT sends its TCH request in the first serving area with the valid UATI (i.e., UATI #3), 408D.

As will be appreciated by one of ordinary skill in the art, FIGS. 4C and 4D show that, upon entry into a new (or previously visited) serving area (e.g., a subnet), an AT must wait to receive a UATI for its new (or previously visited) serving area before obtaining a TCH in the new (or previously visited) serving area. Even in cases where the given AT previously visited a serving area and once had a session established for that serving area, this session information is not stored once the given AT hands off to another serving area. Accordingly, if the given AT is near a boundary region between different serving areas, the given AT can 'ping-pong', or quickly switch back and forth, between the different serving areas. In this case, the given AT will often find itself in a state where it is waiting for a UATI and/or other session parameters during frequent serving area handoffs. Thus, as the given AT will have to establish a new session each time it switches serving areas, a user of the given AT could experience delays in setting up a TCH for a communication session.

Accordingly, embodiments of the invention are directed to maintaining, for at least a threshold period of time, 'old' session information at both a portion of the RAN 120 controlling a previously entered serving area (e.g., such as an RNC controlling a subnet that the given AT has exited) and the given AT as the given AT moves between different serving areas of a wireless communications system. As described below in more detail, in the event that the given AT moves back to a previously entered serving area before the threshold period of time elapses, the given AT can and re-activate its stored UATI and send data using its re-activated UATI without waiting for a new UATI assignment in the previously entered serving area.

Figure 5A:
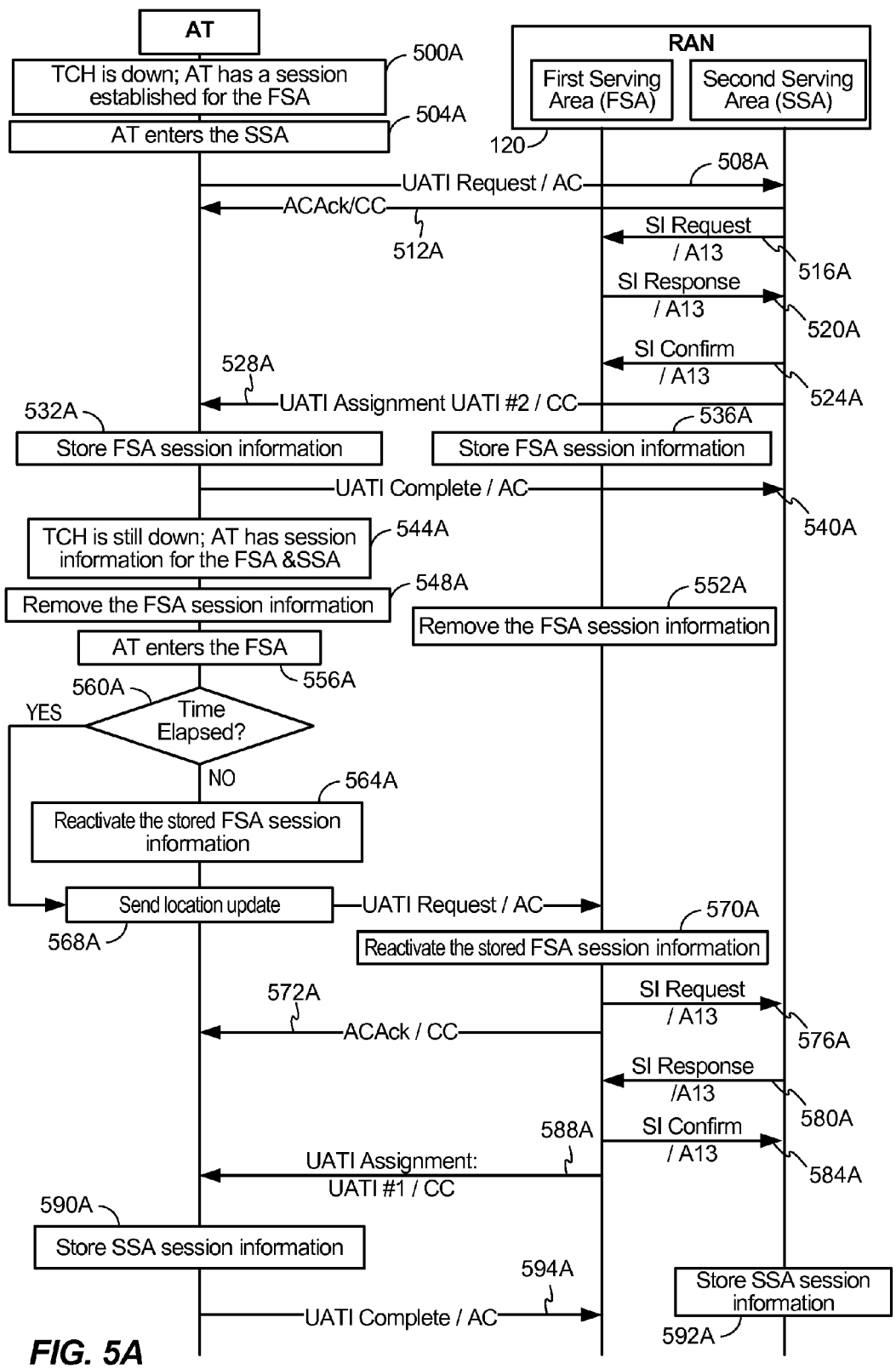
FIG. 5A illustrates a process of selectively maintaining session information for an access terminal while the access terminal navigates in different serving areas of a wireless communications system in accordance with an embodiment of the invention.

Referring to FIG. 5A, assume that a given AT is located in a first serving area (e.g., a subnet), that the given AT does not have a TCH and is not currently participating in a communication session and that the given AT has a session established in the first serving area, 500A. As mentioned above, having a session established means the given AT has obtained session information (e.g., UATI #1, etc.) that can be used to send/receive data between the given AT and the RAN 120 in the first serving area. Referring to FIG. 4B, at 500A of FIG. 5A, the given AT may be located at position #1 within the first serving area, in an example.

Turning back to FIG. 5A, assume that the given AT leaves the first serving area and enters a second serving area, 504A. For example, referring to FIG. 4B, the given AT may travel from position #1 within the first serving area to position #2 within the second serving area. In the example of FIG. 5A, it may further be assumed that this is either the given AT's first time entering the second serving area, or alternatively that it has been a relatively long time since the given AT's last entry into the second serving area. As will be described in more detail below, a 'relatively long time' in this case corresponds to a period that is longer that a time period for which the second serving area is expected to maintain session information from the given AT's previous session in the second serving area.

Accordingly, because the given AT does not yet have session information that can be used in the second serving area (e.g., either because it has never before been to the second serving area or no longer has valid session information that is useable in the second serving area for 'reviving' an old session), the given AT initiates a procedure to establish a session in the second serving area and acquire session information, such as UATI #2 and/or other session parameters.

Accordingly, the given AT sends a UATI request on a reverse link access channel to the RAN 120 to request a UATI that can be used in the second serving area, 508A. After the RAN 120 receives the UATI request, the RAN 120 acknowledges receipt of the UATI request from the given AT by sending an ACAck message to the given AT on the downlink control channel (CC), 512A. However, while the RAN 120 acknowledges the UATI request in 512A, the RAN 120 has not yet assigned the UATI for the second serving area to the given AT.

After the RAN 120 receives the UATI request, aside from ACKing the UATI request as in 512A, the second serving area (e.g., a RNC controlling a particular subnet), which in this case is the 'target' serving area for the handoff, sends an A13 session information request to the first serving area (e.g., again, this can correspond to a RNC controlling a given subnet), which in this case is the 'source' serving area for the handoff, 516A. The first serving area responds to the A13 session information request with an A13 session information response providing the requested session information, 520A. The second serving area ACKs the A13 session information response by sending an A13 session information confirm message back to the first serving area, 524A.

After the first and second serving areas coordinate the given AT's handoff from the first serving area to the second serving area in 516A through 524A, the second serving area assigns a UATI (i.e., UATI #2) for the given AT to use in the second serving area by sending a UATI assignment on the downlink CC, 528A. In at least one embodiment of the invention, the UATI assignment message in 528A can further be configured to indicate, to the given AT, a given time period for which the given AT's 'old' session information for the given AT's previous session in the first serving area will remain valid in the event that the given AT returns to the first serving area. This embodiment is described in more detail below with respect to FIGS. 5C and 5D.

Of course, the UATI assignment message need not be the only way in which the given time period can be indicated to the given AT. In an alternative example, the time period can be a part of the session information which is exchanged between the AT and the RAN 120 during the initial session establishment. In an alternative example, a proprietary message can be exchanged between the given AT and the RAN 120 to inform the given AT of the given time period of validity for the given AT's previous session information. In another alternative example, the given AT can assume that the old session information will remain valid for a default period of time from the handoff to the second serving area without an explicit indication of the period of time from the RAN 120. Accordingly, in view of the different manners by which the given AT and the RAN 120 can negotiate the duration during which old session information is retained, FIG. 5A is described herein with the assumption that, one way or the other, both the RAN 120 and the given AT are both aware of the validity duration, or given period of time, during which session information for previous sessions of the given AT are stored.

After receiving the UATI assignment, the given AT updates one or more registers storing its UATI from the first serving area (i.e., UATI #1) with the newly assigned UATI of the second serving area (i.e., UATI #2), 532A. Also, instead of removing the UATI from the first serving area and/or other session parameters, the given AT stores or cache the session information for its previous session in the first serving area in association with a given time period during which the session information is expected to remain available for use in the event that the given AT returns to the first serving area. Similarly, upon receiving the session information confirm message in 524A, the first serving area also stores or caches the session information that was associated with the given AT's previous session with the same given time period, 536A. The given AT transmits a UATI complete message to the RAN 120 on the reverse link access channel, 540A.

Accordingly, in 544A, the given AT is now located in the second serving area (e.g., at position #2 as shown in FIG. 4B), the given AT does not have a TCH, is not currently participating in a communication session, and the given AT has a session established in the second serving area. Further, while the given AT does not have an active session established in the first serving area, the given AT has retained the session information for the first serving area, which can be used within the given period of time in the event that the given AT returns to the first serving area.

At this point, during the process of FIG. 5A, both the given AT and the RAN 120 monitor the given period of time to determine whether the given period of time has elapsed, and in the event that the given period of time has elapsed without the given AT returning to the first serving area, both the given AT and the first serving area (e.g., or an RNC controlling the first serving area) remove the session information related to the given AT's previous session in the first serving area, 548A and 552A. Accordingly, 548A and 552A each correspond to conditional steps that occur in the event of an 'expiration' of the session information from the given AT's previous session in the first serving area.

At some later point in time, assume that the given AT leaves the second serving area and re-enters the second serving area, 556A. For example, referring to FIG. 4B, the given AT may travel from position #2 within the second serving area to position #3 within the first serving area.

Upon determining that the given AT has re-entered the first serving area, the given AT determines whether the given period of time for which the session information is expected to be valid for use in the first serving area has expired or elapsed, 560A. If the given period of time is determined to have expired, the process advances to 568A, which is described in more detail below.

Otherwise, if the given period of time is determined not to have expired, the given AT 'reactivates' the stored session information for the first serving area, 564A. In other words, the given AT updates one or more registers storing its UATI from the second serving area (i.e., UATI #2) with the stored UATI of the first serving area (i.e., UATI #1). Accordingly, at this point, while not shown explicitly in FIG. 5A, the given AT is capable of sending data on the reverse link to the RAN 120 in the first serving area (e.g., to request a TCH, etc.) without waiting for a UATI assignment message because the given AT knows it can use its old, stored UATI from its previous session. Therefore, as will be described in greater detail below with respect to FIG. 5B, the given AT is capable of sending data to the RAN 120 more quickly as compared to conventional FIGS. 4C and 4D whereby the given AT waits until after the UATI assignment before sending a data transmission that will be acknowledged and recognized by its current serving area.

In 568A, the given AT sends a location update to the RAN 120 in the first serving area to notify the first serving area of the given AT's presence therein. In an example, if 568A occurs after an evaluation that the given time period elapsed in 560A, the location update corresponds to a UATI request message that is sent before any successful data transmission from the given AT. In other words, the expiration of the given time period for the first serving area's session information of the given AT means that the given AT has to first acquire a valid UATI and/or other session parameters before sending data. However, if 568A occurs after an evaluation that the given time period did not elapse in 560A, the location update of 568A can occur after a data transmission. In other words, so long as the location update is sent before the given time period expires the first serving area will keep the given AT's session information reserved, such that the location update need not be sent immediately upon the given AT's re-entry into the first serving area.

Upon receiving the location update, which in the example of FIG. 5A corresponds to a UATI request message, the RAN 120 re-activates the stored session information from the AT's previous session in the first serving area, so long as the given time period has not expired, 570A. The portion of the RAN 120 controlling the first serving area also acknowledges receipt of the UATI request from the given AT by sending an ACAck message to the given AT on the downlink control channel (CC), 572A, sends an A13 session information request to the second serving area, 576A, receives an A13 session information response providing the requested session information, 580A, and ACKs the A13 session information response by sending an A13 session information confirm message back to the second serving area, 584A. At this point, the RAN 120 in the first serving area sends a UATI assignment message to confirm, to the given AT, that its UATI (i.e., UATI #1) is still valid for use within the first serving area, 588A. Also, as will be described in more detail below with respect to FIGS. 5C and 5D, the UATI assignment message can also be configured to indicate, to the given AT, the given time period during which the session information for the given AT's previous session in the second serving area will remain valid in the event that the given AT returns to the second serving area.

Accordingly, in 590A, instead of removing the UATI from the second serving area and/or other session parameters, the given AT stores the session information for its previous session in the second serving area in association with a given time period during which the session information is expected to remain available for use in the event that the given AT returns to the second serving area. Similarly, upon receiving the session information confirm message in 584A, the RAN 120 in the second serving area also stores the session information that was associated with the given AT's previous session with the same given time period, 592A. The given AT transmits a UATI complete message to the RAN 120 on the reverse link access channel, 594A.

In an alternative embodiment, while not shown explicitly in FIG. 5A, if the given AT reactivates the stored session information from the previous session in the first serving area in 564A, it is possible that the given AT can send data using the 'reactivated' session information before the location update (or UATI Request) is sent in 568A. In this case, it will be appreciated that because the given AT does not necessarily require a new UATI for transmitting its data, the UATI Request of 568A need not be sent. Rather, the data transmission from the given AT can function as the location update, which will be interpreted by the RAN 120 as if the UATI request of 568A were sent. Accordingly, in this alternative embodiment, the location update of 568A that is shown as a UATI request can be replaced by a data transmission, with 570A through 592A being performed as when the location update corresponded to a UATI request. In yet another alternative embodiment, even if data is sent between 564A and 568A, the UATI request may still be sent in 568A. While potentially increasing traffic over the reverse-link wireless channel, automatically sending the location update as a UATI request may result in a 'cleaner' or simpler implementation. The particular implementation may thereby vary based on the preferences of a particular vendor.

While FIG. 5A is described whereby the given AT remains idle (e.g., does not participate in an actual communication session), at any point during the process of FIG. 5A, the RAN 120 may have data to send to the given AT, or the given AT may have data to send to the RAN 120 (e.g., if a user of the given AT requests call initiation, etc.). Accordingly, FIG. 5B illustrates an example of how the given AT can send reverse-link data to the RAN 120 after moving from the second serving area back to the first serving area in 556A.

Figure 5B:
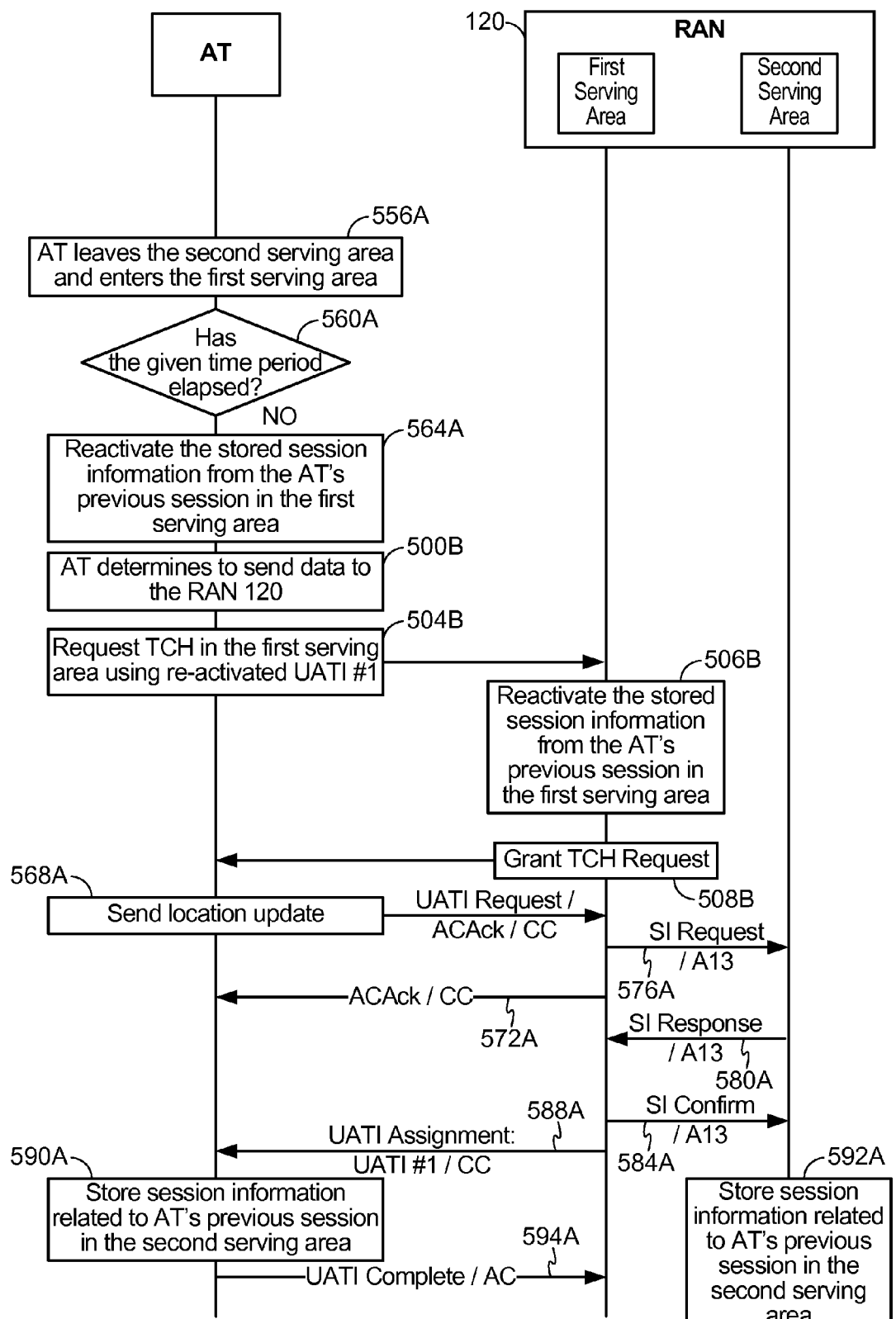
FIG. 5B illustrates a more detailed implementation of the process of FIG. 5A in accordance with an embodiment of the invention.

Referring to FIG. 5B, 556A through 564A correspond to their like-numbered blocks from FIG. 5A, and as such will not be described further for the sake of brevity, except that it will be assumed in FIG. 5B that the given time period has not elapsed in 560A. Accordingly, after 564A, the given AT is at position #2 within the first serving area as shown in FIG. 4B and has re-activated its session information (e.g., UATI #1) for use within the first serving area. In 564A, unlike FIG. 5A where the given AT remains idle, assume that the given AT determines to send data to the RAN 120 in 500B. For example, a user of the given AT can press a push-to-talk (PTT) button to request initiation of a PTT session, the user can request to send a text message, to check voicemails, etc. In 504B, the given AT sends a TCH request in the first serving area using its re-activated UATI (i.e., UATI #1). The RAN 120 in the first serving area receives the TCH request, and re-activates the stored session information from the given AT's previous session in the first serving area, 506B (e.g., similar to 570A of FIG. 5A). It will be appreciated that 506B in FIG. 5B is responsive to the TCH request instead of the location update as in 570A of FIG. 5A because the TCH request with the UATI #1 attached is received before the location update.

Next, the RAN 120 determines that the attached UATI identifying the given AT is valid in the first serving area, and thereby grants the TCH request, 508B. Accordingly, the given AT obtains its TCH without having to wait for a UATI assignment message, or indeed does not even have to wait to send its UATI request before sending its TCH request (e.g., or other data transmission). While not shown, the given AT can thereafter communicate over the TCH obtained in 508B in an active communication session.

At some later point in time, the given AT sends a location update to the RAN 120 in the first serving area to trigger the session transfer between the first and second serving areas, 568A. As will be appreciated, the location update of 568A is not strictly necessary in all implementations. For example, a data packet transmission between 504B and 568A of FIG. 5B may function to update the given AT's location, and can trigger blocks 576A through 594A of FIG. 4B. However, sending a separate location update as shown in 568A of FIG. 5A can facilitate a 'cleaner' or simpler protocol for implementation in the sense that an evaluation of whether data was sent after block 504B need not be performed. Blocks 568A through 594A correspond to their like-numbered blocks from FIG. 5A, and as such will not be described further for the sake of brevity.

Figure 5C:
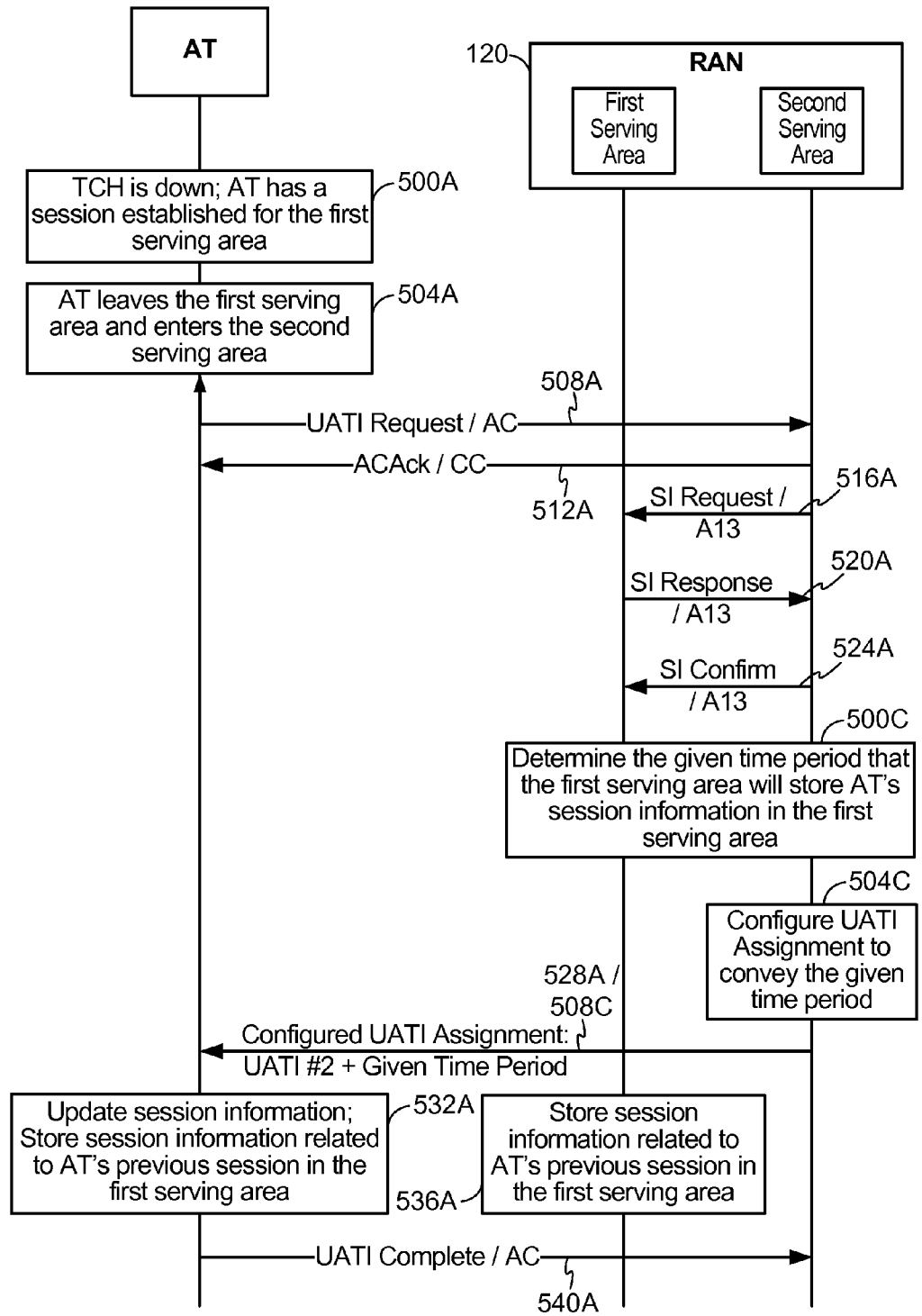
FIG. 5C illustrates a more detailed implementation of a portion of the process of FIG. 5A in accordance with an embodiment of the invention.
Figure 5D:
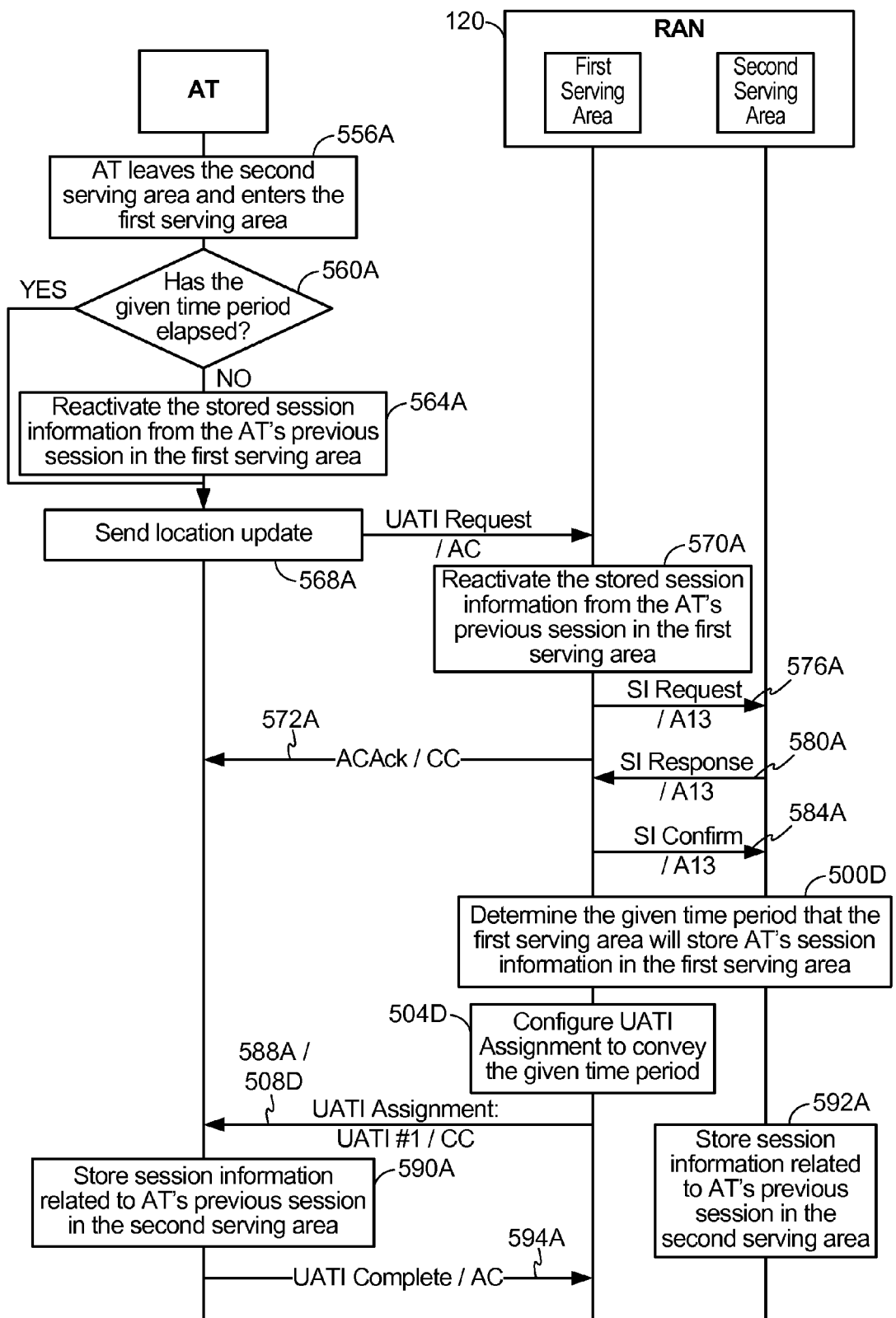
FIG. 5D illustrates another more detailed implementation of a portion of the process of FIG. 5A in accordance with an embodiment of the invention.

FIGS. 5C and 5D illustrate one particular example of how the given AT and the different serving areas of the RAN 120 can coordinate the time period related to how long session information for previous sessions in old serving areas will be valid, or available for use upon the given AT's re-entry into the old serving areas. As will be appreciated, both the given AT and the RAN 120 controlling the particular serving area should be aware of this time period so that the given AT knows whether it can use its stored or cached session information, and so that the RAN 120 maintains its reservation of the session information and can still recognize the given AT.

Referring to FIG. 5C, assume that 500A through 524A are executed as described above in FIG. 5A. In 500C, the RAN 120 determines the given time period that the first serving area will store the given AT's session information in the first serving area. In an example, the given time period can correspond to a fixed, predetermined time period (e.g., 30 minutes, etc.) that begins at a given point in time (e.g., upon transmission or receipt of the A13 session information confirm message in 524A, upon receive of the UATI request in 508A, etc.). Alternatively, the given time period can be adaptive and based on a history of behavior associated with the given AT. For example, if the given AT is leaving a serving area that is far away from the given AT's usual locations of use and the given AT has never before been to the serving area being exited, the given time period may be relatively short (e.g., because unless the given AT is hovering around the boundary region of the serving area, in which case the given AT would move back to the serving area in a short period of time, the given AT would not be considered very likely to return to the serving area so storing its session information indefinitely would not be likely to be useful). In another example, if the given AT has been to the serving area being exited many times before (e.g., the serving area covers the given AT's user's workplace, home, gym, etc.), the given time period may be relatively long. It is even possible for the given time period to be indefinite or infinite, in an example. Thus, the given AT's session information could effectively be permanent in at least one embodiment of the invention. For example, if the given AT is only used as a home phone and is never removed from the given AT's user's house, then the given AT's session information or that serving area could be made permanent such that data could be sent immediately upon power-up without a UATI request and UATI assignment being sent first.

After determining the given time period in 500C, the RAN 120 in the second serving area configures the UATI assignment message to assign a UATI for use in the second serving area (e.g., UATI #2), and also configures the UATI assignment message to indicate the given time period determined in 500C, which indicates the duration of time that UATI #1 and/or other system parameters for the given AT's old session in the first serving area will remain valid, 504C. The RAN 120 then transmits the configured UATI assignment message to the given AT on the downlink CC, 508C, after which 532A through 540A correspond to their like-numbered blocks from FIG. 5A, and as such will not be described further for the sake of brevity.

Referring to FIG. 5D, assume that 556A through 584A are executed as described above in FIG. 5A. In 500D, the RAN 120 determines the given time period that the second serving area will store the given AT's session information in the second serving area. In an example, the determination of 500D could be performed in accordance with any of the examples described above with respect to 500C.

After determining the given time period in 500D, the RAN 120 in the first serving area configures the UATI assignment message to confirm that the given AT's session information (e.g., UATI #1) is still valid for use in the first serving area, and also configures the UATI assignment message to indicate the given time period determined in 500D, which indicates the duration of time that UATI #2 and/or other system parameters for the given AT's old session in the second serving area will remain valid, 504C. The RAN 120 then transmits the configured UATI assignment message to the given AT on the downlink CC, 508D, after which 590A through 594A correspond to their like-numbered blocks from FIG. 5A, and as such will not be described further for the sake of brevity.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of managing session information within a wireless communication system, comprising:

establishing a first session in a first serving area of an access network, the first session associated with first session information including a first identifier that uniquely identifies an access terminal within the first serving area;

determining that the access terminal has exited the first serving area and entered a second serving area of the access network;

establishing a second session upon entry into the second serving area of the access network, the second session associated with second session information including a second identifier that uniquely identifies the access terminal within the second serving area;

storing, responsive to the establishment of the second session, the first session information in association with a given period of time, the given period of time indicating a duration during which the first session information continues to be valid within the first serving area, and wherein the establishing the second session step corresponds to re-activating stored session information from a previous session in the second serving area if the access terminal previously visited the second serving area within a threshold period of time.

2. The method of claim 1, wherein the establishing the first session step corresponds to re-activating stored session information from a previous session in the first serving area if the access terminal previously visited the first serving area within a threshold period of time.

3. The method of claim 1, wherein the first and second identifiers correspond to unicast access terminal identifiers (UATIs).

4. The method of claim 1, wherein the establishing the first session, determining, establishing the second session and storing steps are each performed at the access terminal.

5. The method of claim 4, wherein the establishing the second session step corresponds to re-activating stored session information from a previous session in the second serving area if the access terminal previously visited the second serving area within a threshold period of time.

6. The method of claim 5, further comprising:
after the establishing the second session step, sending a location update to the access network in the second serving area.

7. The method of claim 6, wherein the location update corresponds to a request for a unicast access terminal identifier (UATI) in the second serving area.

8. The method of claim 1, wherein the establishing the first session, determining, establishing the second session and storing steps are each performed at the access network.

9. The method of claim 8, wherein the establishing the first session and storing steps are performed at a portion of the access network controlling the first serving area, and the determining and establishing the second session steps are each performed at a portion of the access network controlling the second serving area.

10. The method of claim 8, wherein the determining step corresponds to receiving a message from the access terminal at the access network in the second serving area.

11. The method of claim 10, wherein the received message corresponds to a request for a unicast access terminal identifier (UATI) or data sent in accordance with session information from a previous session of the access terminal in the second serving area.

12. The method of claim 8, wherein the determining step corresponds to receiving a message at the access network in the first serving area from the access network in the second serving area, the message configured to inform the access network in the first serving area that the access terminal has entered the second serving area.

13. The method of claim 12, wherein the received message corresponds to an A13 signaling message between the access network in the first serving area and the access network in the second serving area.

14. The method of claim 1, wherein the first and second serving areas correspond to different subnets of the access network.

15. The method of claim 1, further comprising:
removing the stored first session information from storage if the access terminal is determined not to have re-entered the first serving area within the given period of time.

16. The method of claim 1, wherein the first and second sessions correspond to Point-to-Point Protocol (PPP) sessions.

17. The method of claim 1, wherein the entry of the access terminal into the second serving area corresponds to a handoff of the access terminal from the first serving area to the second serving area.

18. A network communication entity configured to manage session information within a wireless communication system, comprising:
means for establishing a first session in a first serving area of an access network, the first session associated with first session information including a first identifier that uniquely identifies an access terminal within the first serving area;
means for determining that the access terminal has exited the first serving area and entered a second serving area of the access network;
means for establishing a second session upon entry into the second serving area of the access network, the second session associated with second session information including a second identifier that uniquely identifies the access terminal within the second serving area;
means for storing, responsive to the establishment of the second session, the first session information in association with a given period of time, the given period of time indicating a duration during which the first session information continues to be valid within the first serving area, and
wherein the establishing the second session step corresponds to re-activating stored session information from a previous session in the second serving area if the access terminal previously visited the second serving area within a threshold period of time.

19. The network communication entity of claim 18, wherein the network communication entity corresponds to either the access terminal or a given portion of the access network.

20. A network communication entity configured to manage session information within a wireless communication system, comprising:
logic configured to establish a first session in a first serving area of an access network, the first session associated with first session information including a first identifier that uniquely identifies an access terminal within the first serving area;
logic configured to determine that the access terminal has exited the first serving area and entered a second serving area of the access network;
logic configured to establish a second session upon entry into the second serving area of the access network, the second session associated with second session information including a second identifier that uniquely identifies the access terminal within the second serving area;
logic configured to store, responsive to the establishment of the second session, the first session information in association with a given period of time, the given period of time indicating a duration during which the first session information continues to be valid within the first serving area, and
wherein the establishing the second session step corresponds to re-activating stored session information from a previous session in the second serving area if the access terminal previously visited the second serving area within a threshold period of time.

21. The network communication entity of claim 20, wherein the network communication entity corresponds to either the access terminal or a given portion of the access network.

22. A non-transitory computer-readable storage medium comprising instructions, which, when executed by a network communication entity configured to manage session information within a wireless communication system, cause the network communication entity to perform operations, the instructions comprising:
- program code to establish a first session in a first serving area of an access network, the first session associated with first session information including a first identifier that uniquely identifies an access terminal within the first serving area;
- program code to determine that the access terminal has exited the first serving area and entered a second serving area of the access network;
- program code to establish a second session upon entry into the second serving area of the access network, the second session associated with second session information including a second identifier that uniquely identifies the access terminal within the second serving area;
- program code to store, responsive to the establishment of the second session, the first session information in association with a given period of time, the given period of time indicating a duration during which the first session information continues to be valid within the first serving area, and
- wherein the establishing the second session step corresponds to re-activating stored session information from a previous session in the second serving area if the access terminal previously visited the second serving area within a threshold period of time.

23. The non-transitory computer-readable storage medium of claim 22, wherein the network communication entity corresponds to either the access terminal or a given portion of the access network.

* * * * *